United States Patent
Isshiki et al.

[11] Patent Number: 6,117,035
[45] Date of Patent: *Sep. 12, 2000

[54] TOOTHED BELT INCLUDING SHORT FIBERS DISTRIBUTED THEREIN WITH A PREDETERMINED ORIENTATION

[75] Inventors: Shigehiro Isshiki; Tsutomu Tokunaga; Yoshitaka Sato, all of Nara, Japan

[73] Assignee: Unitta Company, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,675

[22] Filed: Jun. 20, 1997

[30] Foreign Application Priority Data

Jun. 20, 1996 [JP] Japan .................................. 8-179950

[51] Int. Cl.[7] ........................................................ F16G 1/28
[52] U.S. Cl. ........................... 474/205; 474/204; 474/260
[58] Field of Search .................................. 474/205, 204, 474/260

[56] References Cited

U.S. PATENT DOCUMENTS

| | | |
|---|---|---|
| 3,250,653 | 5/1966 | Geist et al. . |
| 3,535,946 | 10/1970 | Miller ...................................... 474/205 |
| 3,835,720 | 9/1974 | Fisher et al. . |
| 4,228,692 | 10/1980 | Jacob et al. . |
| 4,235,119 | 11/1980 | Wetzel . |
| 4,504,342 | 3/1985 | Marsh et al. ............................. 156/138 |
| 4,533,420 | 8/1985 | Wetzel . |
| 4,583,963 | 4/1986 | Marsh et al. ............................. 474/205 |
| 4,617,075 | 10/1986 | Wetzel et al. . |
| 4,626,232 | 12/1986 | Witt ........................................ 474/205 |
| 4,775,357 | 10/1988 | Wolfe ..................................... 474/205 |
| 4,895,555 | 1/1990 | Watanabe et al. ...................... 474/260 |
| 5,387,160 | 2/1995 | Nakajima et al. ...................... 474/205 |
| 5,417,618 | 5/1995 | Osako et al. ............................ 474/205 |
| 5,492,507 | 2/1996 | Kumazaki ............................... 474/205 |
| 5,501,643 | 3/1996 | Isshiki et al. . |
| 5,711,734 | 1/1998 | Shioyama et al. ...................... 474/260 |

FOREIGN PATENT DOCUMENTS

| | | |
|---|---|---|
| 0599145 | 11/1993 | European Pat. Off. . |
| 2437859 | 3/1975 | Germany . |
| 3490289 | 6/1985 | Germany . |
| 54-80353 | 6/1979 | Japan . |
| 58-91947 | 6/1983 | Japan . |
| 61-69542 | 5/1986 | Japan . |
| 62-128251 | 8/1987 | Japan . |
| 1-8759 | 3/1989 | Japan . |
| 4331843 | 11/1992 | Japan . |

OTHER PUBLICATIONS

English Language Abstract of JP No. 63–167147, published on Jul. 11, 1988.

Patent Abstracts of Japan, vol. 7, No. 189 (M–237).

Database WPI, abstract XP 002050828.

*Primary Examiner*—Daniel P. Stodola
*Assistant Examiner*—Gregory J. Strimbu
*Attorney, Agent, or Firm*—Greenblum & Bernstein, P.L.C.

[57] ABSTRACT

A toothed belt includes a front rubber layer having teeth formed in the front rubber layer. A plurality of short fibers are entirely distributed in the front rubber layer. A first side of the front rubber layer is covered with a cover fabric. A back rubber layer contacts a second side of the front rubber layer. A plurality of cord elements extend along a length of the belt and are interposed between the front rubber layer and the back rubber layer in such a manner that a portion of each cord element is embedded in the front rubber layer, and the remaining portion of each cord element is embedded in the back rubber layer. Additionally, that portion of the plurality of short fibers that is positioned in a peripheral area of the front rubber layer adjacent to the upper surface of the front rubber layer is substantially parallel to an upper surface of each tooth of the front rubber layer, and another portion of the short fibers that is positioned in a central area of each tooth of the front rubber layer is substantially perpendicular to the lower surface of the front rubber layer.

20 Claims, 9 Drawing Sheets

TOOTHED BELT INCLUDING SHORT FIBERS DISTRIBUTED THEREIN WITH A PREDETERMINED ORIENTATION

BACKGROUND OF THE INVENTION

1. Field of the Invention

The present invention relates to a toothed belt, which may be a so-called timing belt or synchronous belt, used as a power transmission belt in, for example, an engine of a vehicle such as an automobile, to transmit a rotational force of a crank shaft thereof to a cam shaft, a balancer shaft, a drive shaft of a fuel injection pump and so on.

2. Description of the Related Art

Conventionally, such a toothed belt comprises a toothed rubber layer having teeth formed on a surface thereof, a back rubber layer adhered to the other surface of the toothed rubber layer, and a plurality of cord elements embedded in a boundary between the toothed rubber layer and the back rubber layer.

Recently, with the advance in performance of an engine of a vehicle, such as an automobile, the number of revolutions of the an engine has increased. The toothed belt used to rotationally drive a cam shaft, a fuel injection pump or the like is subjected to a larger load.

Breakage of the teeth of the toothed belt is prematurely caused because of the larger stress and strains of an increasing load to which the toothed belt is subjected and, consequently, the service life of the toothed belt is shortened.

SUMMARY OF THE INVENTION

Therefore, an object of the present invention is to provide a toothed belt which is constituted such that a premature breakage of teeth of the toothed belt can be prevented, to prolong the service life of the toothed belt.

In accordance with the present invention, a toothed belt comprises: a toothed rubber layer having teeth formed on a surface thereof and containing a plurality of short fibers entirely distributed therein; a cover fabric covering the surface of said toothed rubber layer on which the teeth are formed; a back rubber layer integrally applied to another surface of said toothed rubber layer; and a plurality of cord elements disposed across a width of the belt and intervened between said toothed rubber layer and said back layer in such a manner that a portion of each cord element is embedded in said toothed rubber layer, and the remaining portion thereof is embedded in said back rubber layer. The short fibers are entirely distributed in said toothed rubber layer, and are regularly oriented.

The short fibers may be substantially oriented in a length direction in said toothed rubber layer. In other words, the short fibers may be distributed in the length direction in said toothed rubber.

The short fibers may be oriented along a toothed-profile surface of the teeth of said toothed rubber layer, at a peripheral area of said toothed rubber layer, adjacent to the toothed-profile surface thereof. In this case, the short fiber, at a central area of said teeth of said toothed rubber layer, may be substantially oriented perpendicularly to a surface of said toothed rubber layer, to which said back rubber layer is applied.

On the other hand, the short fibers, in said toothed rubber layer, may be substantially oriented in a width direction thereof.

The short fiber may be comprised of short aramid fibers. In this case, the short aramid fibers may be either short meta-aramid fibers or short para-aramid fibers. The fibers may have a length of approximately 1 to approximately 6 mm. Preferably, the fibers have a length of approximately 3 mm.

An amount of said short fibers is in a range of approximately 3 to approximately 30 phr with respect to 100 phr of a rubber stock for said toothed rubber layer. Preferably, an amount of said short fibers is approximately 6.5 phr with respect to 100 phr of a rubber stock for said toothed rubber layer.

A rubber stock for said toothed rubber layer and said back rubber layer may be comprised of hydrogenated nitrile rubber having a hydrogenation rate of no less than 91%. The rubber stock may contain an organic peroxide-type vulcanizing agent. Also, the rubber stock may contain sulfur as a vulcanizing agent, and a sulfur-type vulcanizing accelerator.

Preferably, the cover fabric and a rubber stock for said toothed rubber layer are preformed into a profile analogous to a finished profile of the toothed belt.

The cover fabric may be comprised of a weave of stretchable composite yarns, laid along a length direction of the toothed belt, and nonstretchable yarns, laid along a width direction of the toothed belt. In this case, said cover fabric should exhibit an elasticity so that said cover fabric is only broken when stretching said cover fabric from between approximately 30% to approximately 80% with respect to an original size thereof. The cover fabric may be treated with a resonocinol formaldehyde latex solution.

Each of said cord elements may be formed of high strength glass fibers, and these cord elements may be arranged at a cord gap of approximately 0.17 to approximately 0.28 mm.

Also, each of the cord elements may be formed of aramid, and these cord elements may be arranged at a cord gap of approximately 0.25 to approximately 0.36 mm.

Preferably, the cord elements are treated with a resorcinol formaldehyde latex solution, a rubber solution and a solution of cashew-modified phenol resin.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
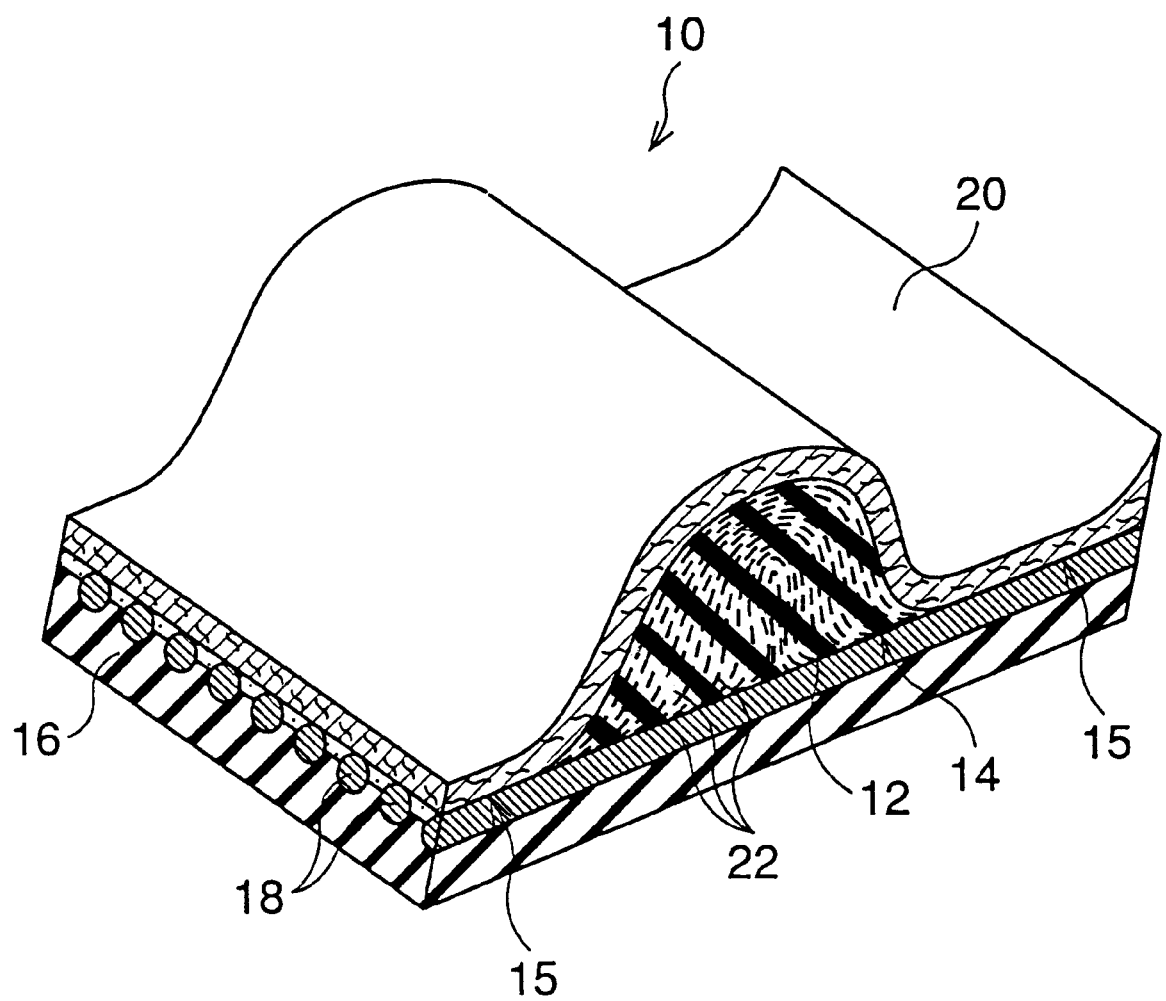
FIG. 1 is a partial perspective view showing a first embodiment of a toothed belt according to the present invention.

FIG. 1 shows a first embodiment of a toothed belt, generally indicated by reference numeral 10, which is constituted according to the present invention. In this drawing, only a part of the toothed belt 10, which is cut away therefrom, is illustrated. The toothed belt 10 comprises a toothed rubber layer 12 having alternate teeth 14 and bottom lands 15 formed on a surface thereof, a back rubber layer 16 applied to the other surface of the toothed rubber layer 12, and a plurality of cord elements 18 embedded in the toothed rubber layer 12 and the back rubber layer 16 at a boundary therebetween. Note, the cord elements 18 are formed by a pair of cords wound spirally in the length direction of the toothed belt 10. Note, one of the cords is an S-twisted cord, and the other cord is a Z-twisted cord. The toothed belt 10 also comprises a cover fabric 20 covering the surface of the toothed rubber layer 12 on which the alternate teeth 14 and bottom lands 15 are formed. The cover fabric 20 is formed of aramid fibers and nylon fibers.

The toothed rubber layer 12 contains a multitude of short fibers 22 mixed therein, the short fibers 22 being regularly and evenly distributed throughout the entire toothed rubber layer 12, as shown in FIG. 1. Namely, the short fibers 22 are disposed and oriented in the length direction of the toothed belt 10, along and generally parallel to a toothed-profile surface of the alternate teeth 14 and bottom lands 15, at a peripheral area of the toothed rubber layer 12 adjacent to the toothed-profile surface thereof. On the other hand, at a central area of each tooth 14, the short fibers 22 are oriented perpendicularly to the surface of the toothed rubber layer 12 to which the back rubber layer 16 is applied. In either case, all of the short fibers 22 contained in the toothed rubber layer 12 are substantially oriented in the length direction of the toothed belt 10 so as to define an angle of approximately 90° with the generatrix defining the toothed-profile surface of the alternate teeth 14 and bottom lands 15.

Figure 2:
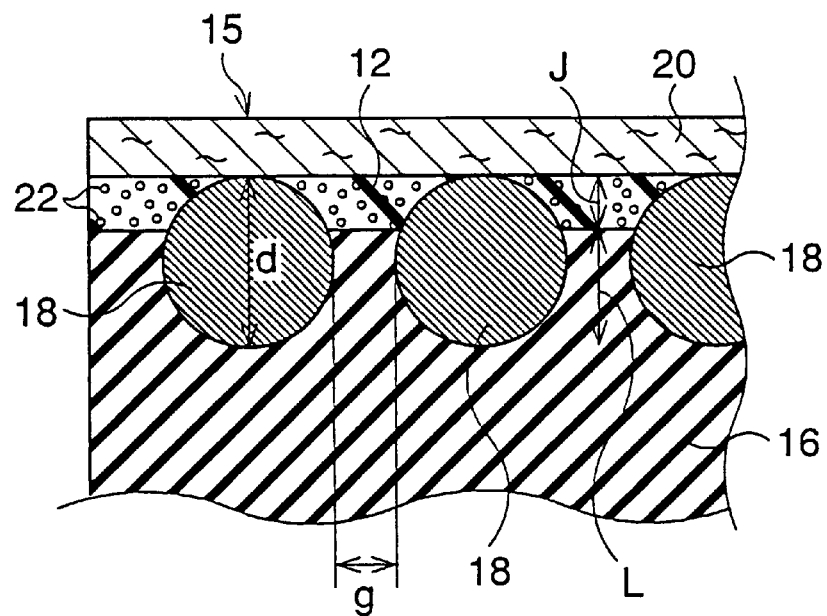
FIG. 2 is an enlarged cross-sectional view showing a cross-section of a bottom land of the toothed belt shown in FIG. 1.

FIG. 2 shows an enlarged cross-section of the bottom land 15 depicted in FIG. 1. In this drawing, although the cord elements 18 are illustrated so as to be in contact with the cover fabric 20 at the bottom land 15, a thin rubber layer forming a part of the toothed rubber layer 12 is intervened between the cord elements 18 and the cover fabric 20. The cord elements 18 are embedded at the boundary of the toothed rubber layer 12 and the back rubber layer 16. A portion of each cord element 18 is disposed in the toothed rubber layer 12, having the short fibers, and the other portion of each cord element 18 is disposed in the back rubber layer 16. In this embodiment, the portion of each cord element 18 disposed in the toothed rubber layer 12 corresponds to approximately one third of a diameter "d" of the cord element 18, whereas the portion of each cord element 18 disposed in the back rubber layer 16 corresponds to approximately two thirds of the diameter "d".

Note, in FIG. 2, a depth, by which the cord element 18 is embedded in the toothed rubber layer 12, is indicated by a distance "J", and a depth, by which that the cord element 18 is embedded in the back rubber layer 16, is indicated by a distance "L".

As shown in FIG. 2, the cord elements 18 are arranged at a cord gap of "g". For example, when each of the cord elements 18 is formed of high strength glass fibers, the cord gap "g" may be from about 0.17 to about 0.28 mm. Also, when each of the cord elements 18 is formed of aramid fibers, the cord gap "g" may be from about 0.25 to about 0.36.

Figure 3:
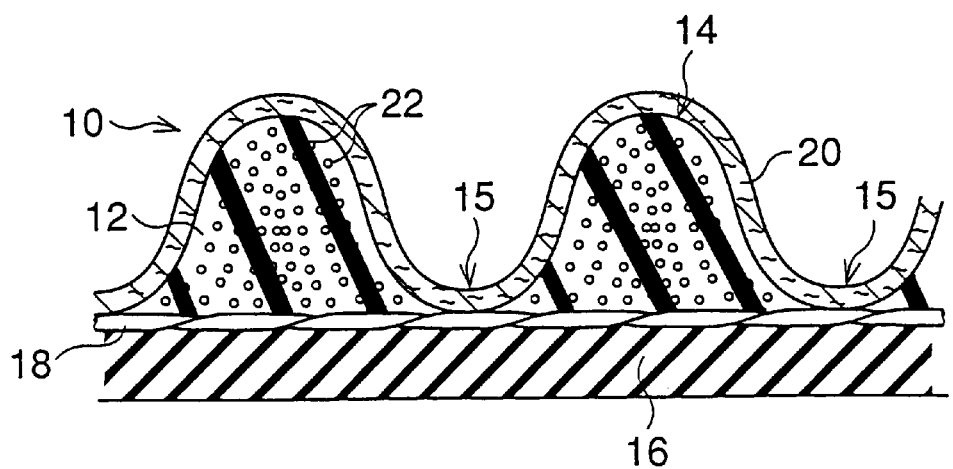
FIG. 3 is a longitudinal cross sectional view showing a second embodiment of a toothed belt according to the present invention.

FIG. 3, partially, shows a second embodiment of a toothed belt constituted according to the present invention. In this drawing, the features similar to those of FIG. 1 are indicated by the same reference numerals. The second embodiment in FIG. 3 is substantially identical to that of the first embodiment, as shown in FIGS. 1 and 2, except that the short fibers 22, contained in the toothed rubber layer 12, are disposed and oriented in the width direction of the toothed belt 10, along the toothed-profile surface of the alternate teeth 14 and bottom lands 15. In short, in the second embodiment, all of the short fibers 22 are substantially oriented in the width direction of the toothed belt 10 and are approximately parallel with the generatrix defining the toothed-profile surface of the alternate teeth 14 and bottom lands 15.

For the sake of convenience, hereinafter, the orientation of the short fibers 22 according to the first embodiment (FIGS. 1 and 2) is referred to as an orientation-in-length, and the orientation of the short fibers 22 according to the second embodiment (FIG. 3) is referred to as an orientation-in-width.

In the first and second embodiments, the short fibers 22 are formed from either meta-aramid fibers or para-aramid fibers. Nevertheless, the short fibers 22 may be formed of another type of suitable fiber. An amount of the short fibers 22 contained in the toothed rubber layer 12 is about 3 to about 30 parts by weight per hundred parts rubber (phr) for producing the toothed rubber layer 12. The rubber stock comprises a hydrogenated nitrile rubber which may be vulcanized by organic peroxide, sulfur or the like.

In general, when the short fibers are contained in the toothed rubber layer 12, an elasticity of the toothed rubber layer is lowered. However, the elasticity of the toothed rubber layer can be increased by adding carbon black thereto. Accordingly, by adjusting an amount of carbon black added to the toothed rubber layer 12, the elasticity of the toothed rubber layer 12 can be controlled.

In the first and second embodiments, the cover fabric 20 is comprised of a twill weave of stretchable composite yarns laid along the length direction of the toothed belt 10 and nonstretchable yarns laid along the width direction of the toothed belt 10.

The stretchable composite yarn of the cover fabric 20 may be comprised of a core yarn, a spun yarn wrapped around the core yarn, and a crimping yarn wrapped around the outside of the spun yarn in the reverse direction with respect to the wrapping direction of the spun yarn. Preferably, an elastic yarn of polyurethane is used as the core yarn; aramid fibers, superior in heat resistance, are used for the spun yarn; and aliphatic synthetic fibers, such as nylon fibers which are superior in wear resistance and adhesion, are used for the crimping yarn.

The nonstretchable yarn of the cover fabric 20 is, preferably, a yarn superior in inelasticity, rigidity, and heat resistance. For example, a filament yarn of nylon fiber is suitable as the nonstretchable yarn of the cover fabric 20.

The cover fabric 20 is treated with, for example, a resorcinol formaldehyde latex (RFL) solution comprised of carboxylated-nitrile rubber as a latex component plus ammonia solution chlorophenol-formaldehyde-resorcinol condensation product such as 2, 6-bis-4-chlorophenol derivative, whereby a binding strength between the cover fabric 20 and the toothed rubber layer 12 can be improved and enhanced.

The pair of cords, which is wound spirally in the length direction of the toothed belt 10 to form the cord elements 18, may be formed of either high strength glass fibers or aramid fibers. As mentioned above, when the cords are formed of the high strength glass fibers, the winding of the cords is carried out at the cord gap of about 0.17 mm to about 0.28 mm. When the cords are formed of the aramid fibers, the winding of the cords is carried out at the cord gap of about 0.25 mm to about 0.36 mm.

With reference to FIGS. 4 to 7, processes of producing a toothed belt 10 will now be explained below.

Figure 4:
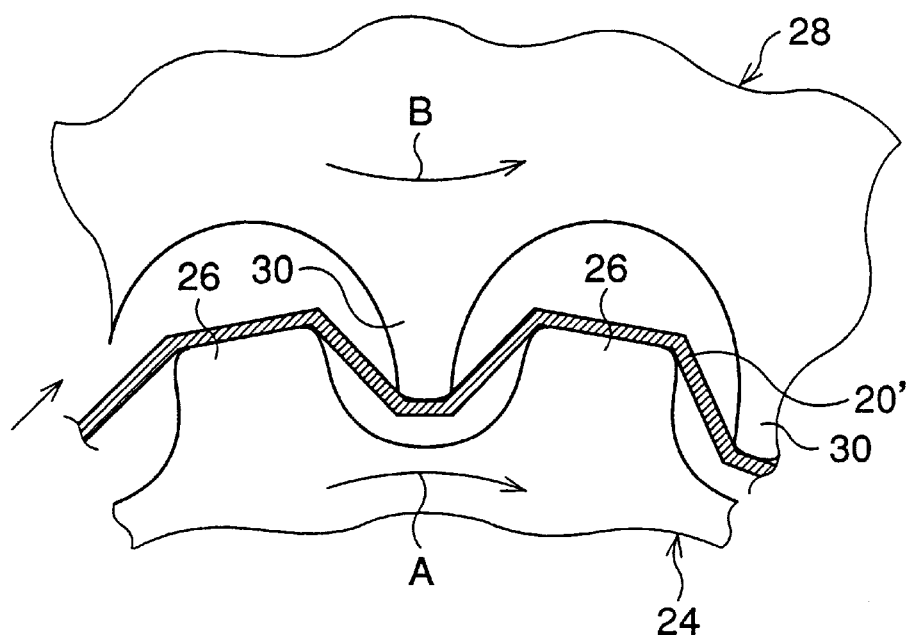
FIG. 4 is a partial schematic view showing a preforming process of a cover fabric which forms one of the elements of the toothed belt according to the present invention.

Firstly, as shown in FIG. 4, a fabric web 20' is fed onto a toothed preforming drum 24 having teeth 26 formed therearound. The fabric web 20' is then partially wound around the toothed peripheral surface of the toothed preforming drum 24. The toothed preforming drum 24 is engaged with a toothed roller 28 having teeth 30 formed therearound. The toothed preforming drum 24 and toothed roller 28 are rotated in the directions indicated by arrows A and B, respectively, in FIG. 4. The fabric web 20' is nipped by the toothed preforming drum 24 coinciding with the toothed roller 28 to, thereby, preform the fabric web 20' into a corrugated configuration.

The fabric web 20' has the same weave tissue as that of the above-mentioned cover fabric 20 and, finally, forms the cover fabric 20 of a finished toothed belt 10. The feed of the fabric web 20' to the preforming drum 24 is carried out in such a manner that the stretchable composite yarns thereof are perpendicularly oriented to the rotational axis of the preforming drum 24.

Figure 5:
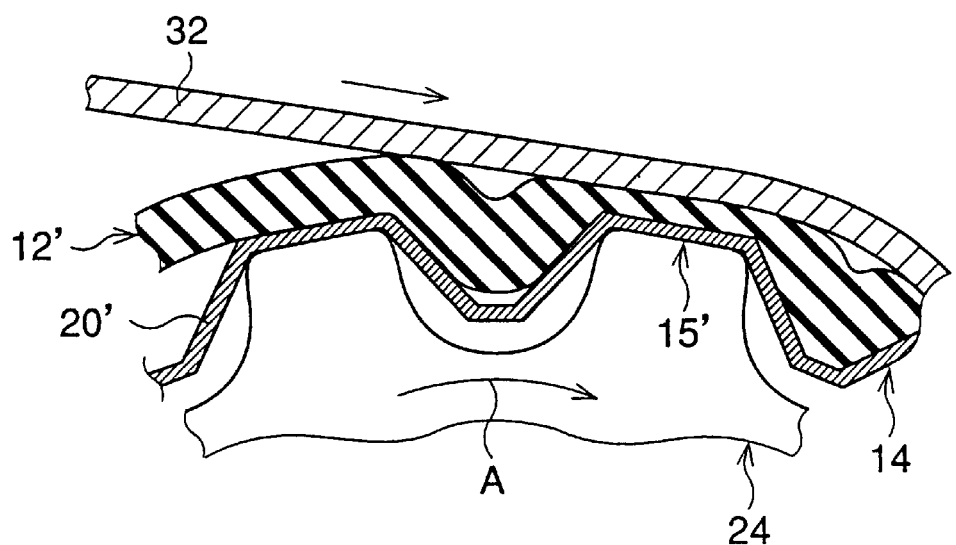
FIG. 5 is a partial schematic view showing a preforming process of a toothed rubber layer which forms one of the elements of the toothed belt according to the present invention.

As shown in FIG. 5, a steel belt 32 is applied to a portion of the peripheral surface of the preforming drum 24. A rubber compound sheet 12' is introduced into a space between the corrugated fabric web 20' and the steel belt 32, and is then nipped therebetween so as to be shaped to conform with the corrugated profile of the corrugated fabric web 20', as shown in FIG. 5, resulting in an intermediate product having the corrugated fabric web 20' and the shaped rubber compound sheet 12' associated with each other.

The shaped rubber compound sheet 12', which includes alternate teeth 14' and bottom lands 15', finally forms the toothed rubber layer 12, which, correspondingly, has alternate teeth 14 and bottom lands 15, in the finished toothed belt 10. The rubber compound sheet 12' contains a multitude of short fibers entirely mixed and distributed therein. The short fibers are substantially unidirectionally oriented in the rubber compound sheet 12'.

In the first method of preforming, in which the introduction of the rubber compound sheet 12' onto the toothed preforming drum 24 is carried out, the short fibers are, at this time, substantially oriented to define an angle of approximately 90° with the rotational axis of the preforming drum 24. The resultant intermediate product is used to produce the toothed belts 10, as shown in FIGS. 1 and 2, having the short fibers 20 exhibiting an orientation-in-length.

In the second method of preforming, in which the introduction of the rubber compound sheet 12' onto the toothed preforming drum 24 is carried out, the short fibers are substantially oriented parallel to the rotational axis of the preforming drum 24, the resultant intermediate product is used to produce the toothed belts 10, as shown in FIG. 3, having the short fibers 20 exhibiting an orientation-in-width.

Figure 6:
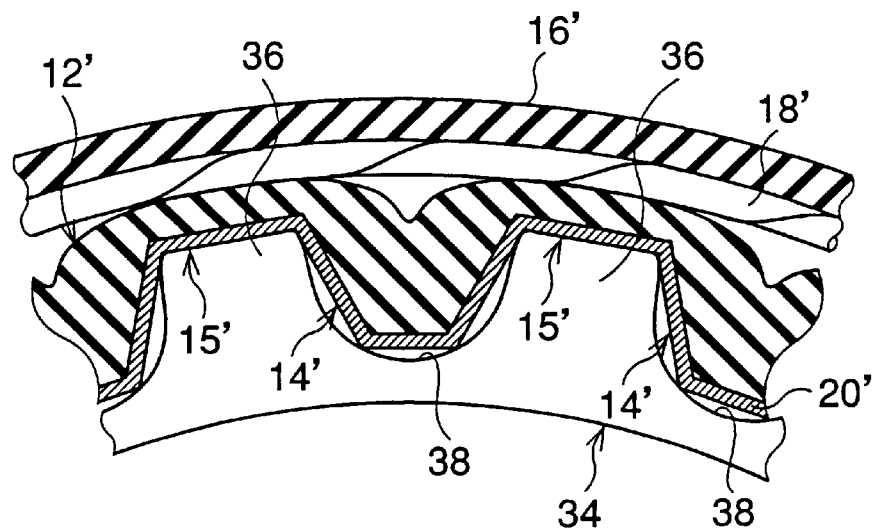
FIG. 6 is a partial schematic view showing a belt forming process according to the present invention.

The intermediate product is divided into sectional parts, each of which has a predetermined length. Then, a sectional part is wrapped around a belt forming drum 34 having alternate teeth 36 and bottom lands 38, as shown in FIG. 6. A profile of each alternate tooth 36 is conformed to the profile of each bottom land 15, of the finished toothed belt 10, and a profile of each bottom land 38 is conformed to the profile of each tooth 14, of the finished toothed belt 10.

Successively, a pair of cords 18', which is made of high strength glass fibers, is spirally wound around the peripheral surface of the sectional part, which is wrapped around the belt forming drum 34 at the cord gap of about 0.17 to about 0.28 mm. Note, one of cords 18' is an S-twisted cord, and the other cord 18' is a Z-twisted cord. The pair of cords 18' finally forms the plurality of cord elements 18 in the finished toothed belt 10. Then, a rubber compound sheet 16' is wrapped around the peripheral surface of the spirally-wound cord 18', as shown in FIG. 6. Finally, the rubber compound sheet 16' finally forms the back rubber layer 16 in the finished toothed belt 10.

Thereafter, the belt forming drum 34 carrying the belt parts 12', 16', 18', and 20', is placed in an oven (not shown), and is subjected to vulcanization therein at a given temperature and under a given pressure. As shown in FIG. 6, although many spaces remain among the belt parts 12', 16', 18', and 20', these spaces are eliminated during the vulcanization.

Figure 7:
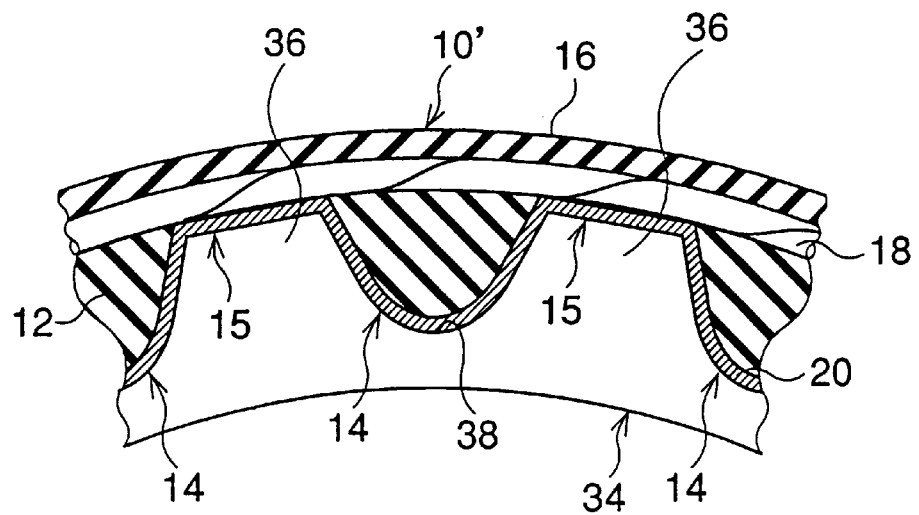
FIG. 7 is a partial schematic view showing a final stage of the belt forming process according to the present invention.

After vulcanization is completed, a cylindrical belt slab 10' is obtained around the belt forming drum 34, as shown FIG. 7. The belt forming drum 34, carrying the belt slab 10', is taken out of the oven, and then the belt slab 10' is removed from the belt forming drum 34. Thus, it is possible to obtain toothed belts 10 by grinding the cylindrical belt slab 10' with a grinder and then by cutting the same in circular slices. Note, in FIG. 7, the respective parts of the belt slab 10' are indicated by the same reference numerals as that of the finished toothed belt 10.

In the finished toothed belt 10, the stretchable composite yarns of the cover fabric 20 are extended along the length direction of the toothed belt 10, and the nonstretchable yarns of the cover fabric 20 are extended in the width direction of the toothed belt 10. Accordingly, the toothed belt 10 is stretchable only in the length direction thereof. Preferably, the cover fabric 20 exhibits an elasticity so that the cover fabric 20 is only broken when the cover fabric 20 is stretched between about 30% and about 80%, with respect to an original size thereof.

Figure 8:
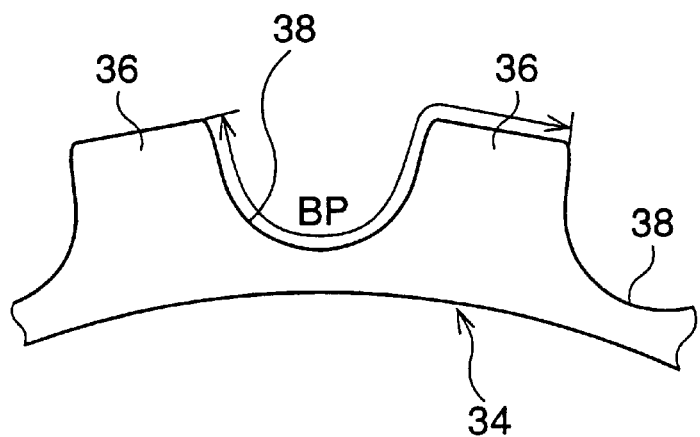
FIG. 8 is a partial view of a belt forming drum used in the belt forming process of FIGS. 6 and 7.
Figure 9:
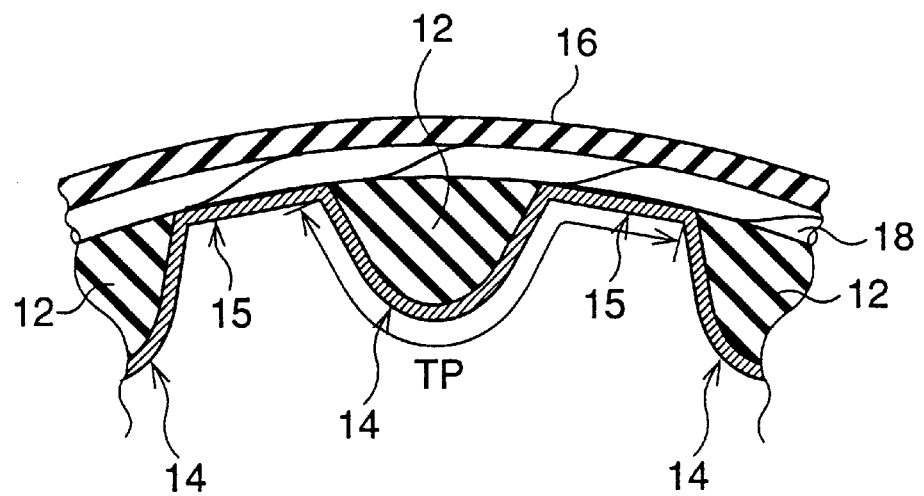
FIG. 9 is a partial longitudinal sectional view of a belt slab formed by the belt forming drum of FIG. 8.

The finished toothed belt 10 is evaluated as to whether or not the profile of the adjacent alternate tooth 14 and bottom land 15 of the finished toothed belt 10 conforms with the profile of the adjacent bottom land 38 and alternate tooth 36 of the belt forming drum 34 within a permissible range. This evaluation is defined as a moldability MB. In particular, for the evaluation, as shown in FIG. 8, a perimeter distance BP between two edges on the same sides of two consecutive teeth 36 is measured along the profile of the alternate teeth 36 and bottom lands 38 of the belt forming drum 34, and, as shown in FIG. 9, a perimeter distance TP between two roots of the same sides of two consecutive alternate teeth 14 is measured along the profile of the alternate teeth 14 and bottom lands 15. Then, the moldability MB(%) is calculated as follows:

$$MB = TP/BP \times 100$$

If the moldability MB is 93% or more than 93%, the finished toothed belt concerned is evaluated as being acceptable. If the moldability MB is less than 93%, the finished toothed belt concerned is evaluated as being unacceptable.

With reference to the following TABLE 1, by way of example, types A, B, C, D and E of hydrogenated nitrile rubber compound, which may be used to produce a toothed belt 10 according to the present invention, are shown.

TABLE 1

| TYPES OF HYDROGENATED NITRILE RUBBER COMPOUND | A TYPE | B TYPE | C TYPE | D TYPE | E TYPE |
|---|---|---|---|---|---|
| CHARACTERISTICS OF RUBBER STOCK | | | | | |
| #1 | 96 | 96 | 92.8 | 92.8 | 96 |
| #2 | 11 | 11 | 21 | 21 | 11 |
| #3 | ≧120 | ≧120 | ≈78 | ≈78 | ≧120 |
| COMPOSITIONS OF RUBBER COMPOUND | | | | | |
| #4 | 100 | 100 | 100 | 100 | 100 |
| #5 | 20 | 20 | 60 | 40 | 20 |
| #6 | 10 | 10 | 10 | 10 | 10 |
| #7 | 1.0 | 1.0 | 1.0 | 1.0 | 1.0 |
| #8 | 1.5 | 1.5 | — | — | 1.5 |
| #9 | — | — | 1.0 | 1.0 | — |
| #10 | 25 | 25 | — | — | 25 |
| #11 | 18 | 18 | — | — | 18 |
| #12 | 6 | 6 | — | — | 6 |
| #13 | 10 | 10 | 5.0 | 5.0 | 10 |
| #14 | — | — | 0.8 | 0.8 | — |
| #15 | — | — | 2.7 | 2.7 | — |
| #16 | — | — | 1.0 | 1.0 | — |
| #17 | — | 6.5 | — | 6.5 | — |
| #18 | — | — | — | — | 6.5 |
| TOTAL (phr) | 191.5 | 198.0 | 181.0 | 168.0 | 198.0 |

In this TABLE 1, respective references #1 to #10 represent the following items:

1: a rate of hydrogenation of the hydrogenated nitrile rubber (%);
2: an iodine value (an absolute number);
3: Mooney viscosity;
4: hydrogenated nitrile rubber (phr);
5: carbon black (phr);
6: isonoryltrimellite (phr);
7: stearic acid (phr);
8: 4,4'-(α,α-dimethylbenzyl) diphenylamine (phr), which is available as NAUGARD 445 from Uniroyal Chemical K.K.;
9: N-isopropyl-N'-phenyl-p-phenylenediamine (phr);
10: metacrylic acid (phr);
11: organic peroxide type vulcanizing agent (phr) including dicumylperoxide, which is available as Dicup 40C from Hercules Co,, and 1,3-bis(t-butylperoxy-m-isopropyl)benzene, which is available as Peroxymon F40 from NOF CORPORATION;
12: trimethylolpropane trimethacrylate (phr), which is available as Sanester TMP from Sanshin Chemical IND, CO., LTD;
13: zinc oxide (phr);
14: sulfur (phr);
15: sulfur type vulcanizing accelerator (phr) including tetramethyltiuram disulfide, dipentamethylenethiuram tetrasulfide, and N-cyclohexyl1-2-benzothiazoyl sulfenamide;
16: tellurum diethyl dithiocarbamate (phr);
17: meta-aramid short fibers (phr); and
18: para-aramid short fibers (phr).

Note, the mark "- - -" indicates no contents.

As is apparent from TABLE 1, in the A TYPE hydrogenated nitrile rubber compound, a rubber stock, exhibiting a hydrogenation of 96%, an iodine value of 11, and a Mooney viscosity of more than 120, is used. Also, the A TYPE hydrogenated nitrile rubber compound is composed of 20 phr of carbon black, 10 phr of isonoryltrimellite, 1.0 phr of stearic acid, 1.5 phr of NAUGARD 445, 25 phr of metacrylic acid, 18 phr of organic peroxide type vulcanizing agent (Dicup 40C plus Peroxymon F40), 6 phr of Sanester TMP, and 10 phr of zinc oxide with respect to 100 phr of the above-mentioned rubber stock. Sample pieces of the A TYPE rubber compound for a tensile test and sample pieces of the A TYPE rubber compound for a compression test were prepared and vulcanized.

The B TYPE hydrogenated nitrile rubber compound is identical to the A TYPE hydrogenated nitrile rubber compound except that the former is further composed of 6.5 phr of meta-aramid fibers. The meta-aramid short fibers are entirely mixed and distributed in the B TYPE rubber compound, and are substantially unidirectionally oriented therein. Sample pieces of the B TYPE rubber compound for a tensile test and sample pieces of the B TYPE rubber compound for a compression test were prepared and vulcanized.

In the case of the B TYPE rubber compound containing the oriented short fibers, two kinds of sample pieces were made for the tensile test. Namely, in one kind of sample pieces, the short fibers are oriented perpendicularly to a direction in which the sample pieces are stretched and, in the other kind of sample pieces for the tensile test, the short fibers are oriented in parallel with a direction in which the sample pieces are stretched.

Further, in the case of the B TYPE rubber compound containing the oriented short fibers, two kinds of sample pieces were also made for the compression test. Namely, in one kind of sample pieces for the compression test, the short fibers are oriented perpendicularly to a direction in which the sample pieces are compressed, and, in the other kind of sample pieces for the compression test, the short fibers are oriented in parallel with a direction in which the sample pieces are compressed.

In the C TYPE hydrogenated nitrile rubber compound, a rubber stock, exhibiting a hydrogenation of 92.8%, an iodine value of 21, and a Mooney viscosity of approximately 78, is used. Also, the C TYPE hydrogenated nitrile rubber compound is composed of 60 phr of carbon black, 10 phr of isonoryltrimellite, 1.0 phr of stearic acid, 1.0 phr of N-isopropyl-N'-phenyl-p-phenylenediamine, 5.0 phr of zinc oxide, 0.8 phr of sulfur, 2.7 phr of sulfur type vulcanizing accelerator and 1.0 phr of tellurium diethyl dithiocarbamate with respect to 100 phr of the above-mentioned rubber stock. Sample pieces of the C TYPE rubber compound for a tensile test and sample pieces of the C TYPE rubber compound for a compression test were prepared and vulcanized.

The D TYPE hydrogenated nitrile rubber compound is identical with the C TYPE hydrogenated nitrile rubber compound except that the former is further composed of 6.5 phr of meta-aramid short fibers and the amount of carbon black is reduced from 60 phr to 40 phr, as shown in TABLE 1. The meta-aramid fibers are entirely mixed and distributed in the D TYPE rubber compound and are substantially unidirectionally oriented therein. Sample pieces of the D TYPE rubber compound for a tensile test and sample pieces of the D TYPE rubber compound for a compression test were prepared and vulcanized.

In the case of the D TYPE rubber compound containing the oriented short fibers, two kinds of sample pieces were made for the tensile test. Namely, in one kind of sample pieces, the short fibers are oriented perpendicularly to a direction in which the sample pieces are stretched and, in the other kind of sample pieces for the tensile test, the short fibers are oriented in parallel with a direction in which the sample pieces are stretched.

Further, in the case of the D TYPE rubber compound containing the oriented short fibers, two kinds of sample pieces were also made for the compression test. Namely, in one kind of sample pieces for the compression test, the short fibers are oriented perpendicularly to a direction in which the sample pieces are compressed and, in the other kind of sample pieces for the compression test, the short fibers are oriented in parallel with a direction in which the sample pieces are compressed.

The E TYPE hydrogenated nitrile rubber compound is identical with the B TYPE hydrogenated nitrile rubber compound except that 6.5 phr of the para-aramid short fibers are substituted for the 6.5 phr of meta-aramid short fibers. The para-aramid fibers are entirely mixed and distributed in the E TYPE rubber compound and are substantially unidirectionally oriented therein. Sample pieces of the E TYPE rubber compound for a tensile test and sample pieces of the E TYPE rubber compound for a compression test, were prepared and vulcanized.

In the case of the E TYPE rubber compound containing the oriented short fibers, two kinds of sample pieces were made for the tensile test. Namely, in one kind of sample pieces, the short fibers are oriented perpendicularly to a direction in which the sample pieces are stretched and, in the other kind of sample pieces for the tensile test, the short fibers are oriented in parallel with a direction in which the sample pieces are stretched.

Further, in the case of the E TYPE rubber compound containing the oriented short fibers, two kinds of sample pieces were also made for the compression test. Namely, in one kind of sample pieces for the compression test, the short fibers are oriented perpendicularly to a direction in which the sample pieces are compressed, and, in the other kind of sample pieces for the compression test, the short fibers are oriented in parallel with a direction in which the sample pieces are compressed.

A tensile test was carried out with respect to each of the sample rubber pieces (A, B, C, D and E). Each of the sample rubber pieces was stretched, at 200 mm/min., and a distance of 40 mm, between lines marked on the sample piece concerned, was measured. The results are shown in the graphs of FIGS. 10 and 11.

Figure 10:
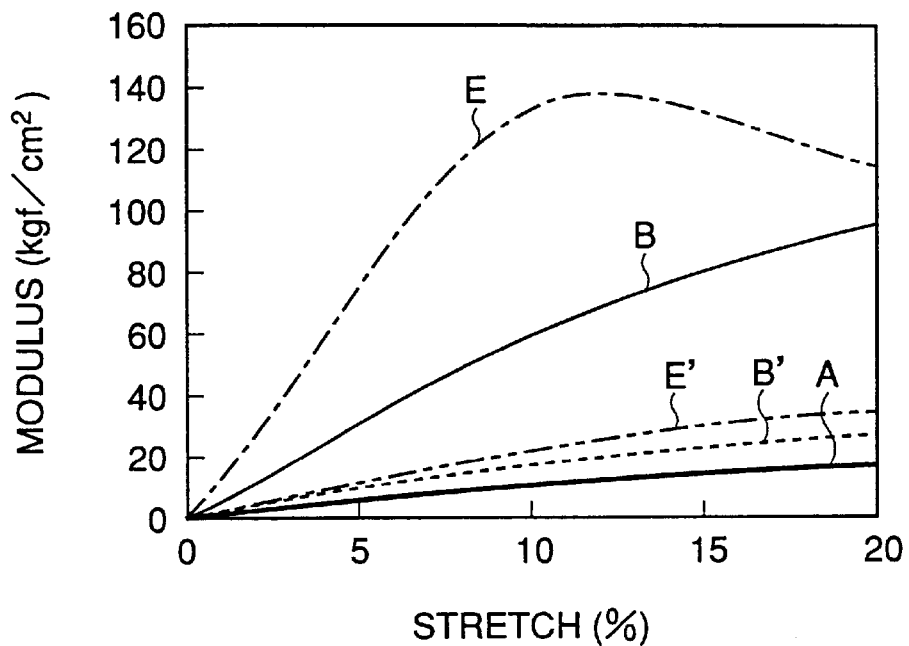
FIG. 10 is a graph showing results of a tensile test carried out on sample rubber pieces obtained from various types of hydrogenated nitrile rubber compounds for the toothed belt according to the present invention.

In the graph of FIG. 10, reference A represents a characteristic of the sample rubber piece made from the A TYPE rubber compound; reference B represents a characteristic of a sample rubber piece made from the B TYPE rubber compound and having the short fibers oriented in the stretching direction; reference B' represents a characteristic of a sample rubber piece made from the B TYPE rubber compound and having the short fibers oriented perpendicularly to the stretching direction; reference E represents a characteristic of a sample rubber piece made from the E TYPE rubber compound and having the short fibers oriented in the stretching direction; and reference E' represents a characteristic of a sample rubber piece made from the E TYPE rubber compound and having the short fibers oriented perpendicularly to the stretching direction.

Figure 11:
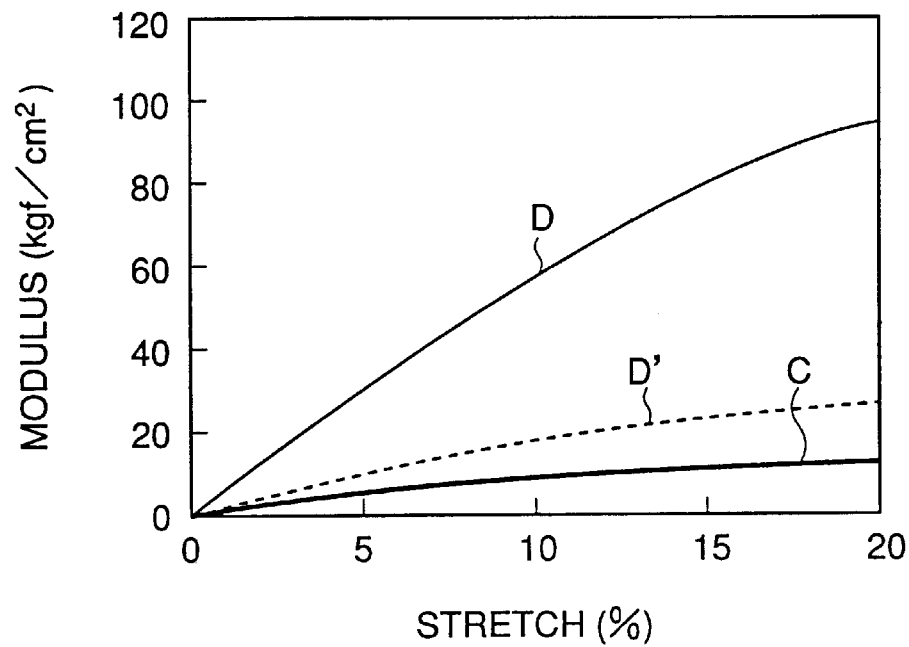
FIG. 11 is another graph showing results of a tensile test carried out on sample rubber pieces obtained from various types of hydrogenated nitrile rubber compounds for the toothed belt according to the present invention.

In the graph of FIG. 11, reference C represents a characteristic of a sample rubber piece made from the C TYPE rubber compound; reference D represents a characteristic of a sample rubber piece made from the D TYPE rubber compound and having the short fibers oriented in the stretching direction; and reference D' represents a characteristic of a sample rubber piece made from the D TYPE rubber compound and having the short fibers oriented perpendicularly to the stretching direction.

As is apparent from the results shown in FIGS. 10 and 11, the sample rubber pieces, made from the A and C TYPE rubber compounds containing no short fibers, exhibit a low value of modulus against the stretching. Also, the sample rubber pieces, made from the B, D and E TYPE rubber compounds containing the short fibers, exhibit a higher value of modulus, against the stretching, than that of the sample rubber pieces containing no short fibers. Especially, the sample rubber pieces (B, D, and E) having the short fibers oriented in the stretching direction exhibit a considerably higher value of modulus against the stretching.

A compression test was carried out with respect to each of the sample rubber pieces (A, B, C, D, and E). Each of the sample rubber pieces was formed as a column-like shape, having a length of 25.4 mm, and was axially compressed. The results are shown in graphs of FIGS. 12 and 13.

Figure 12:
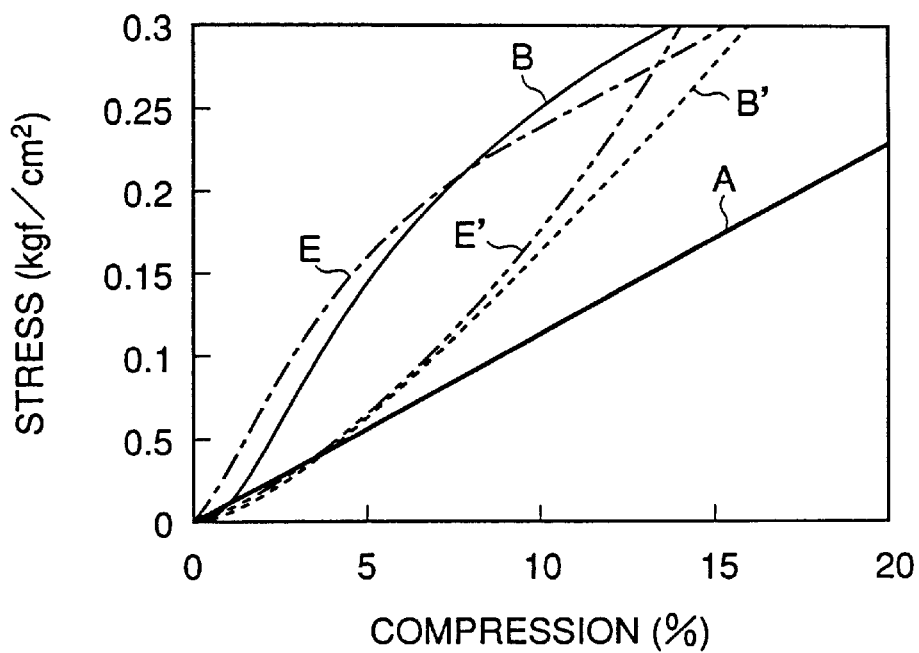
FIG. 12 is a graph showing results of a compression test carried out on sample rubber pieces obtained from various types of hydrogenated nitrile rubber compounds for the toothed belt according to the present invention.

In the graph of FIG. 12, reference A represents a characteristic of a sample rubber piece made from the A TYPE rubber compound; reference B represents a characteristic of a sample rubber piece made from the B TYPE rubber compound and having the short fibers oriented in the compressing direction; reference B' represents a characteristic of a sample rubber piece made from the B TYPE rubber compound and having the short fibers oriented perpendicularly to the compressing direction; reference E represents a characteristic of a sample rubber piece made from the E TYPE rubber compound and having the short fibers oriented in the compressing direction; and reference E' represents a characteristic of a sample rubber piece made from the E TYPE rubber compound and having the short fibers oriented perpendicularly to the compressing direction.

Figure 13:
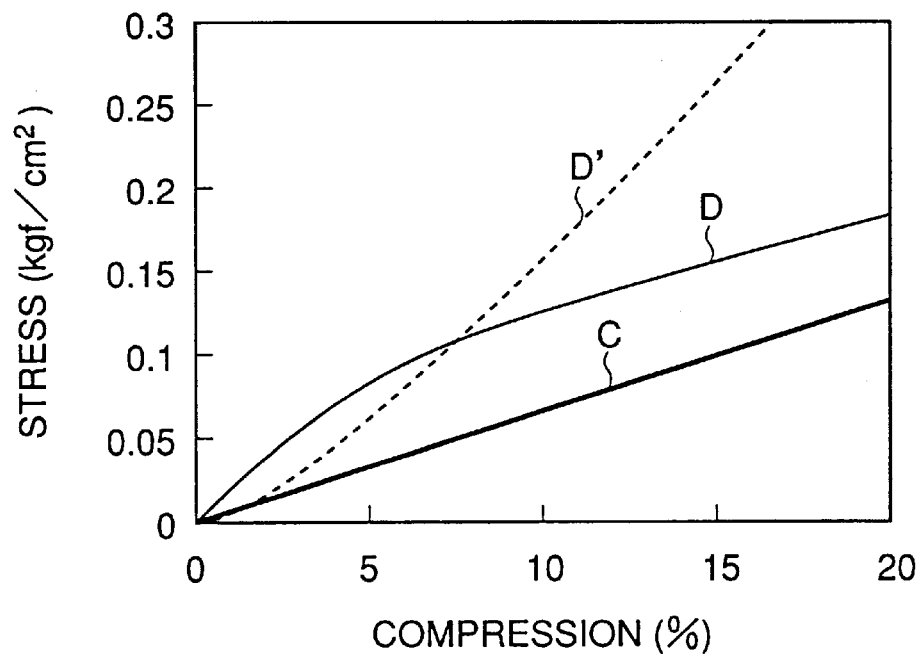
FIG. 13 is another graph showing results of a compression test carried out on sample rubber pieces obtained from various types of hydrogenated nitrile rubber compounds for the toothed belt according to the present invention.

In the graph of FIG. 13, reference C represents a characteristic of a sample rubber piece made from the C TYPE rubber compound; reference D represents a characteristic of a sample rubber piece made from the D TYPE rubber compound and having the short fibers oriented in the compressing direction; and reference D' represents a characteristic of a sample rubber piece made from the D TYPE rubber compound and having the short fibers oriented perpendicularly to the compressing direction.

As is apparent from the results shown in FIGS. 12 and 13, the sample rubber pieces, made from the A and C TYPE rubber compounds containing no short fibers, exhibit a low value of stress against compression. Also, the sample rubber pieces, made from the B, D and E TYPE rubber compounds containing the short fibers, exhibit a higher value of stress against compression than that of the sample rubber pieces containing no short fibers.

Five respective kinds of toothed belts according to the present invention were produced as Examples 1, 2, 3, 4 and 5 in accordance with the present invention, and four kinds of toothed belts were produced as Comparative Examples 1, 2, 3 and 4. The production of Examples 1, 2, 3, 4 and 5 and the production of Comparative Examples 1, 2, 3 and 4 were carried out under the requirements shown in the following TABLE 2.

TABLE 2

| BELT EXAMPLES | E-1 | E-2 | E-3 | E-4 | E-5 | C-1 | C-2 | C-3 | C-4 |
|---|---|---|---|---|---|---|---|---|---|
| BACK RUBBER LAYER | A | A | C | C | A | A | C | A | A |
| TOOTHED RUBBER LAYER | B | B | D | D | E | A | C | F | F |
| ORIENTATION- |  | ● |  | ● | ● |  |  |  |  |

TABLE 2-continued

| BELT EXAMPLES | E-1 | E-2 | E-3 | E-4 | E-5 | C-1 | C-2 | C-3 | C-4 |
|---|---|---|---|---|---|---|---|---|---|
| IN-LENGTH ORIENTATION | ● | | ● | | | | | | |
| IN-WIDTH ORIENTATION | | ● | | ● | | | | | |
| NO ORIENTATION | | | | | ● | ● | ● | ● | ● |
| COVER FABRIC | ● | ● | ● | ● | ● | ● | ● | ● | ● |
| CORD ELEMENTS | ● | ● | ● | ● | ● | ● | ● | ● | ● |
| TREATMENT 1 | ● | ● | | | ● | ● | ● | ● | ● |
| TREATMENT 2 | | | ● | ● | | | ● | | |
| WINDING GAP OF CORD (mm) | .26 | .26 | .26 | .26 | .26 | .26 | .26 | .26 | .47 |
| MOLDABILITY MB | G | G | G | G | G | G | G | B | G |
| FIRST RUNNING TEST (hr) | 404 | 400 | — | — | 420 | 126 | — | — | — |
| SECOND RUNNING TEST (hr) | 321 | — | 399 | 186 | 350 | 125 | 30 | — | 146 |

As shown in TABLE 2, in Example 1 (E-1), a back rubber layer (16) was obtained from a rubber compound sheet made of the A TYPE hydrogenated nitrile rubber compound, and a toothed rubber layer (12) was obtained from a rubber compound sheet formed from the B TYPE hydrogenated nitrile rubber compound. Short fibers were distributed in the toothed rubber layer (12) in an orientation-in-length.

A cover fabric (20) was produced in the manner as mentioned above. In particular, the cover fabric (20) was comprised of a 2/2 twill weave, the warp being of stretchable composite yarns, and the weft being of nonstretchable yarns. A density of the stretchable composite yarns was 150 lines/25 mm, each of the composite yarns being comprised of an elastic yarn of polyurethane (420 d) as a core yarn, a spun yarn of aramid fibers (200 d) wrapped around the core yarn and a nylon 66 wooly yarn (100 d) as a crimping yarn wrapped around the outside of the spun yarn in the reverse direction to that of the wrapping direction of the spun yarn. On the other hand, a density of the nonstretchable yarns was 170 lines/25 mm, each of the nonstretchable yarns being composed of a nylon 66 wooly yarn (100 d). Note, the cover fabric 20 was treated with the resorcinol formaldehyde latex (RFL) solution, as mentioned above.

In Example 1 (E-1), a pair of cords forming a plurality of cord elements (18) of a toothed belt (10) was produced and treated in a manner represented by "TREATMENT 1" shown in TABLE 2. In particular, high strength glass fibers having a diameter of 7 μm were immersed in an RFL solution, comprised of butadiene-styrene-vinylpyridine polymer plus chlorosulfonated polyethylene latex (7:3) as the latex component, and then were dried to form an RFL layer on the glass fibers. Successively, three bundles of 200 high strength glass fibers were placed together and given a primary twist to make a strand. Then, eleven of these strands were placed together and given a secondary twist to obtain the cord.

Note, when the cord is subjected to an S-twist, the cord is produced as an S-twisted cord and, when the cord is subjected to a Z-twist, the cord is produced as a Z-twisted cord.

Each of the resultant S-twisted cord and Z-twisted cord was immersed in a rubber solution of chlorosulfonated polyethylene, and was then dried, to thereby obtain the cord with an overcoat layer. Further, the cord with the overcoat layer was immersed in a 28 percent solution of cashew-modified phenol resin in methyl etyl ketone, and was then dried, thereby forming the cashew-modified phenol resin layer on the overcoat layer of the cord.

In the process for producing the toothed belt (10), a spiral winding of the cords around the belt forming drum 34 (FIG. 6) was carried out at a cord gap of 0.26 mm. This winding gap of the cords interferes in the moldability MB, as mentioned above. In particular, during vulcanization, a material of the rubber compound sheet 16', corresponding to the back rubber layer (16), is partially moved toward the rubber compound sheet 12', corresponding to the toothed rubber layer (12), through spaces between the windings of the cords. Accordingly, the closer the winding gap of the cords, the less the movement of the material of the rubber compound sheet 16' toward the rubber compound sheet 12', resulting in lowering the moldability MB. In Example 1 (E-1), the moldability MB was evaluated as being acceptable and this good evaluation is represented by a mark G in TABLE 2.

As is apparent from TABLE 2, Example 2 (E-2) is similar to Example 1 (E-1) except that the short fibers are distributed in the toothed rubber layer (12) in an orientation-in-width. In Example 2 (E-2), the moldability MB was also evaluated as being acceptable.

As shown in TABLE 2, in Example 3 (E-3), a back rubber layer (16) was obtained from a rubber compound sheet made of the C TYPE hydrogenated nitrile rubber compound. A toothed rubber layer (12) was obtained from a rubber compound sheet made of the D TYPE hydrogenated nitrile rubber compound. Short fibers were distributed in the toothed rubber layer (12) in an orientation-in-length.

In Example 3 (E-3), the same cover fabric (20) as in Example 1 was used. A pair of cords being similar to the pair of cords used in Example 1, except that the former cord was treated and produced in a manner represented by "TREATMENT 2" shown in TABLE 2, was also used. In particular, in the "TREATMENT 2", high strength glass fibers having a diameter of 7 μm were also immersed in the RFL solution, comprised of butadiene-styrene-vinylpyridine polymer plus chlorosulfonated polyethylene latex (7:3) as the latex component, and were then dried to form an RFL layer on the glass fibers. Similar to the case of Example 1, three bundles of 200 high strength glass fibers were placed together and given a primary twist to make a strand. Then, eleven strands were also placed together and given a secondary twist to obtain the cord. The resultant cord was immersed in a rubber solution of chlorosulfonated polyethylene and was then dried, to obtain the cord with an overcoat layer. Nevertheless, in the "TREATMENT 2", no cashew-modified phenol resin layer was formed on the overcoat layer of the cord.

Note, similar to the case of Example 1, when the cord is subjected to an S-twist, the cord is produced as an S-twisted cord and, when the cord is subjected to a Z-twist, the cord is produced as a Z-twisted cord.

Also, in the process for producing the toothed belt (10) of Example 3, a spiral winding of the cords around the belt forming drum 34 (FIG. 6) was carried out, at a cord gap of 0.26 mm, and the moldability MB was evaluated as being acceptable.

As shown in TABLE 2, Example 4 (E-4) is similar to Example 3 (E-3) except that the short fibers are distributed in the toothed rubber layer (12) in an orientation-in-width. In Example 4 (E-4), the moldability MB was also evaluated as being acceptable.

As shown in TABLE 2, in Example 5 (E-5), a back rubber layer (16) was obtained from a rubber compound sheet made of the A TYPE hydrogenated nitrile rubber compound. A toothed rubber layer (12) was obtained from a rubber compound sheet made of the E TYPE hydrogenated nitrile rubber compound. Except for this variance, the other characteristics are the same as in Example 1.

As shown in TABLE 2, in Comparative Example 1 (C-1), a back rubber layer (16) was obtained from a rubber compound sheet made of the A TYPE hydrogenated nitrile rubber compound. A toothed rubber layer (12) was obtained from a rubber compound sheet made of the A TYPE hydrogenated nitrile rubber compound. Except for this variance, the other characteristics are the same as in Example 1 (E-1). Note, in Comparative Example 1, no short fibers are contained in the toothed rubber layer (12).

In Comparative Example 2 (C-2), a back rubber layer (16) was obtained from a rubber compound sheet made of the C TYPE hydrogenated nitrile rubber compound. A toothed rubber layer (12) was obtained from a rubber compound sheet made of the C TYPE hydrogenated nitrile rubber compound. Except for this variance, the other characteristics are the same as in Example 3 (E-3). Note, in Comparative Example 2, no short fibers are contained in the toothed rubber layer (12).

In Comparative Example 3 (C-3), a back rubber layer (16) was obtained from a rubber compound sheet made of the A TYPE hydrogenated nitrile rubber compound. A toothed rubber layer (12) was obtained from a rubber compound sheet made of an F TYPE hydrogenated nitrile rubber compound. Although the F TYPE hydrogenated nitrile rubber compound is composed of the same compositions as the B TYPE hydrogenated nitrile rubber compound (TABLE 1), the rubber compound sheet made of the F TYPE rubber compound has the short fibers randomly oriented and distributed therein.

In Comparative Example 3 (C-3), the same cover fabric (20) as in Example 1 was used. Also, a pair of cords, which is similar to the pair of cords used in Example 1, was spirally wound around the belt forming drum 34 (FIG. 6), at a cord gap of 0.26 mm. Nevertheless, the moldability MB was evaluated as being unacceptable, and this bad evaluation is represented by a mark B in TABLE 2. This is because only the cover fabric (20) was preformed by the toothed preforming drum 24 (FIG. 4). Namely, in Comparative Example 3 (C-3), since the rubber compound sheet corresponding to the toothed rubber layer (12) was directly wrapped around the belt forming drum 34 carrying the preformed cover sheet (20), without being preformed by the toothed preforming drum 24, the moldability MB of more than 93% could not be obtained.

This is significant because the rubber compound sheet corresponding to the toothed rubber layer (12) should be preformed by the toothed preforming drum 24 (FIG. 5) before the winding gap of the cords can be made as close as possible. In other words, in the case of Comparative Example 3 (C-3) in which the rubber compound sheet corresponding to the toothed rubber layer (12) is not preformed, the winding gap of the cords must be more than 0.3 mm before the moldability MB of more than 93% can be obtained.

Note, when the rubber compound sheet corresponding to the toothed rubber layer (12) is preformed as shown in FIG. 5, the winding gap of the cords is permissible in the range of about 0.17 mm to about 0.28 mm.

As is apparent from TABLE 2, Comparative Example 4 (C-4) is similar to Comparative Example 3 (C-3) except that the winding of the cords around the belt forming drum 34 is carried out at a cord gap of 0.47 mm. The moldability MB was evaluated as being acceptable because of the winding gap of 0.47 mm.

With respect to the toothed belts obtained in Examples 1 to 5 and Comparative Examples 1 to 4, a first running test was carried out.

Figure 14:
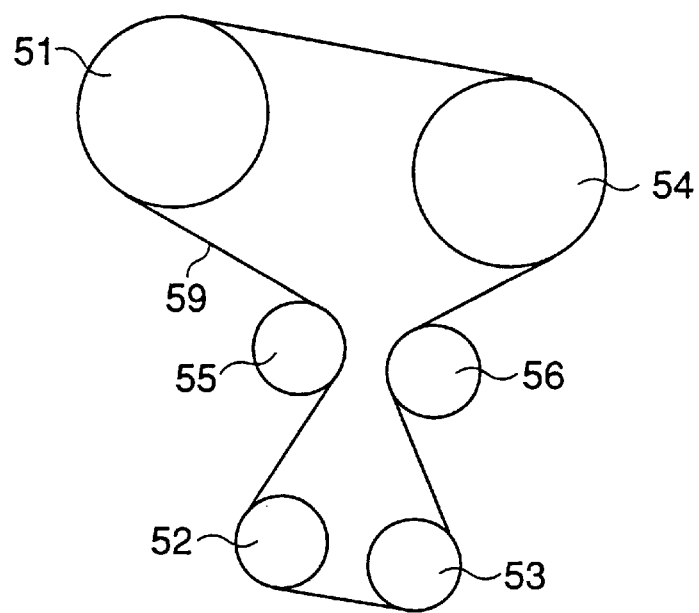
FIG. 14 is a schematic view showing a belt running test machine used to evaluate the toothed belt according to the present invention.

With reference to FIG. 14, a belt running machine used for carrying out the first running test is schematically illustrated. The belt running machine includes: four toothed wheels 51, 52, 53, and 54; an idler pulley 55 provided between the toothed wheels 51 and 52; and a tensioner 56 provided between the toothed wheels 53 and 54. A toothed belt 59 to be tested is entrained by and engaged with the four toothed wheels 51 to 54, as shown in FIG. 14, and the idler pulley 55 is in contact with the back surface of the toothed belt 59. The tensioner 56 is in sprung elastic contact with the back surface of the toothed belt 59 so as to give a predetermined tension to the toothed belt 59. The toothed wheel 51 serves as a drive wheel, and the toothed belt 59 is run by driving the toothed wheel 51.

Figure 16:
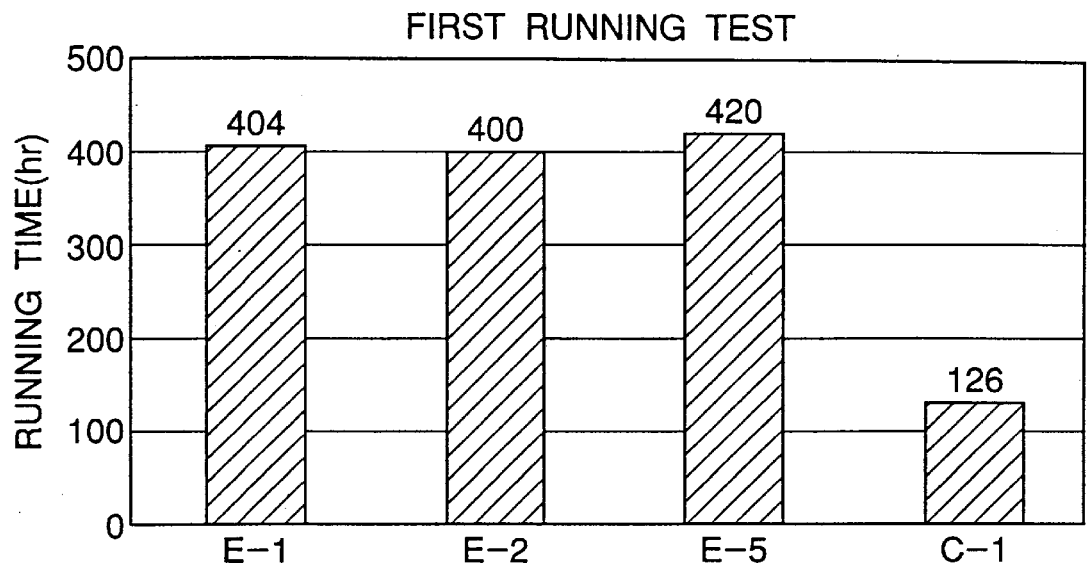
FIG. 16 is a graph showing the results of the running tests executed by the belt running machine of FIG. 14.

Some toothed belts obtained in Example 1 (E-1) were subjected to a running test on the belt running machine shown in FIG. 14. Each of the toothed belts (E-1) was run until teeth (14) were broken. The average running time of the toothed belts was calculated. The average running time was 404 hr, as shown in TABLE 2 and in a graph in FIG. 16.

Some toothed belts obtained in Example 2 (E-2) were also subjected to a running test on the belt running machine shown in FIG. 14, in substantially the same manner as in Example 1. The average running time was 400 hr, as shown in TABLE 2 and in the graph in FIG. 16.

Further, some toothed belts obtained in Example 5 (E-5) were subjected to a running test on the belt running machine shown in FIG. 14, in substantially the same manner as in Example 1. The average running time was 420 hr, as shown in TABLE 2 and in the graph in FIG. 16.

On the other hand, some toothed belts obtained in Comparative Example 1 (C-1) were subjected to a running test on the belt running machine shown in FIG. 14, in substantially the same manner as in Example 1. The average running time was 126 hr, as shown in TABLE 2 and in the graph in FIG. 16.

Accordingly, it was proved that the toothed rubber layer (12) containing the regularly-oriented short fibers exhibits a larger binding strength to the back rubber layer (16).

With respect to the toothed belts obtained in Examples 1 to 5 and Comparative Examples 1 to 4, a second running test was also carried out.

Figure 15:
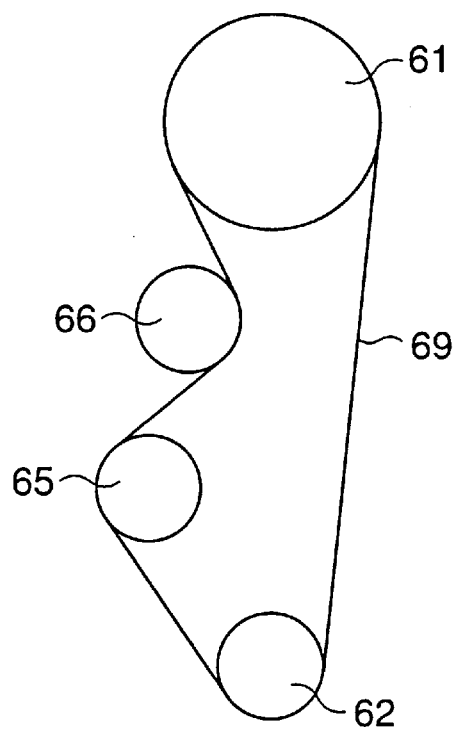
FIG. 15 is a schematic view showing another belt running test machine used to evaluate the toothed belt according to the present invention.

With reference to FIG. 15, a belt running machine used for carrying out the second running test is schematically illustrated. The belt running machine includes: three toothed wheels 61, 62, and 65; and a tensioner 66 provided between the toothed wheels 61 and 65. A toothed belt 69 to be tested is entrained by and engaged with the three toothed wheels 61, 62 and 65, as shown in FIG. 15, and the tensioner 66 is in sprung contact with the back surface of the toothed belt 69 so as to give a predetermined tension to the toothed belt 69. The toothed wheel 61 serves as a drive wheel and the toothed belt 69 is run by driving the toothed wheel 61.

Figure 17:
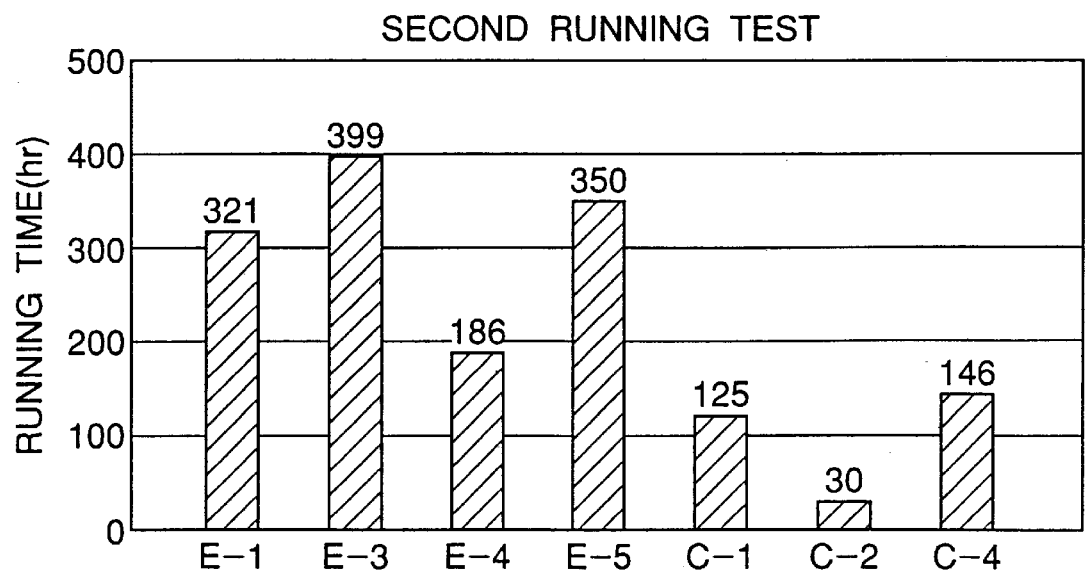
FIG. 17 is a graph showing the results of the running tests executed by the belt running machine of FIG. 15.

Some toothed belts obtained in Example 1 (E-1) were subjected to a running test on the belt running machine shown in FIG. 15, and each of the toothed belts (E-1) was run until teeth (14) were broken. The average running times of the toothed belts was calculated. The average running time was 321 hr, as shown in TABLE 2 and in a graph in FIG. 17.

Some toothed belts obtained in Example 3 (E-3) were also subjected to a running test on the belt running machine shown in FIG. 15, in substantially the same manner as in Example 1. The average running time was 399 hr, as shown in TABLE 2 and in the graph in FIG. 17.

Further, some toothed belts obtained in Example 4 (E-4) were subjected to a running test in the belt running machine shown in FIG. 15, in substantially the same manner as in Example 1. The average running time 186 hr, as shown in TABLE 2 and in the graph in FIG. 17.

Furthermore, some toothed belts obtained in Example 5 (E-5) were subjected to a running test on the belt running machine shown in FIG. 15, in substantially the same manner as in Example 1. The average running time was 350 hr, as shown in TABLE 2 and in the graph in FIG. 17.

On the other hand, some toothed belts obtained in Comparative Example 1 (C-1) were subjected to a running test on the belt running machine shown in FIG. 15, in substantially the same manner as in Example 1. The average running time was 125 hr, as shown in TABLE 2 and in the graph in FIG. 17.

Some toothed belts obtained in Comparative Example 2 (C-2) were subjected to a running test on the belt running machine shown in FIG. 15, in substantially the same manner as in Example 1. The average running time was 30 hr, as shown in TABLE 2 and in the graph in FIG. 17.

Further, some toothed belts obtained in Comparative Example 4 (C-4) were subjected to a running test on the belt running machine shown in FIG. 15, in substantially the same manner as in Example 1. The average running time was 146 hr, as shown in TABLE 2 and in the graph in FIG. 17.

Accordingly, as proved by the second running test, the toothed rubber layer (12) containing the regularly-oriented short fibers exhibits a larger binding strength to the back rubber layer (16).

Note, the toothed belts obtained in Comparative Example 3 (C-3) were incomplete due to a decline of the moldability MB, and thus could not even be subjected to the running test.

Finally, it will be understood by those skilled in the art that the foregoing description is of preferred embodiments of the toothed belt, and that various changes and modifications may be made to the present invention without departing from the spirit and scope thereof.

The present disclosure relates to subject matter contained in Japanese Patent Application No. 8-179950 (filed on Jun. 20, 1996), which is expressly incorporated herein, by reference, in its entirety.

What is claimed is:

1. A toothed belt comprising:
    a front rubber layer having a plurality of teeth formed therein and containing a plurality of short fibers entirely distributed in a non-random manner within said front rubber layer, said plurality of teeth being spaced a part from one another along a length of said front rubber layer, each said tooth extending in a width direction of said front rubber layer, said front rubber layer having an upper surface and a lower surface, each said tooth having an upper surface coincident with said upper surface of said front rubber layer;
    a cover fabric covering said upper surface of said front rubber layer;
    a back rubber layer, discrete from said front rubber layer, contacting said lower surface of said front rubber layer; and
    a plurality of cord elements each extending along the length of said front rubber layer and being interposed between said front rubber layer and said back rubber layer such that a portion of each said cord element of said plurality of cord elements is embedded in said front rubber layer, and a remaining portion of each said cord element is embedded in said back rubber layer,
    wherein a portion of said plurality of short fibers is positioned in a peripheral area of each said tooth adjacent to said upper surface of each said tooth and is substantially parallel to said upper surface of each said tooth of said front rubber layer, and the remaining portion of said short fibers is positioned in a central area of each said tooth of said front rubber layer and is substantially perpendicular to said lower surface of said front rubber layer.

2. A toothed belt as set forth in claim 1, wherein said short fibers comprise short aramid fibers.

3. A toothed belt as set forth in claim 2, wherein said short aramid fibers comprise short meta-aramid fibers.

4. A toothed belt as set forth in claim 2, wherein said short aramid fibers comprise short para-aramid fibers.

5. A toothed belt as set forth in claim 1, wherein said cover fabric is comprised of a weave of stretchable composite yarns, laid along the length of the toothed belt, and non-stretchable yarns, laid along the width of the toothed belt.

6. A toothed belt as set forth in claim 5, wherein said cover fabric exhibits an elasticity so that said cover fabric is only broken when stretching said cover fabric from between approximately 30% to approximately 80% with respect to an original size thereof.

7. A toothed belt as set forth in claim 1, wherein said short fibers each have a length of approximately 1 to approximately 6 mm.

8. A toothed belt as set forth in claim 7, wherein said short fibers preferably each have a length of approximately 3 mm.

9. A toothed belt as set forth in claim 1, wherein said cover fabric is treated with a resorcinol formaldehyde latex solution.

10. A toothed belt as set forth in claim 1, wherein an amount of said short fibers is in a range of approximately 3 to approximately 30 parts per hundred rubber of said rubber forming said front rubber layer.

11. A toothed belt as set forth in claim 10, wherein the amount of said short fibers is approximately 6.5 parts per hundred rubber of said rubber forming said front rubber layer.

12. A toothed belt as set forth in claim 1, wherein, each of said cord elements comprises aramid fibers.

13. A toothed belt as set forth in claim 12, wherein said cord elements are arranged with a gap of approximately 0.25 to approximately 0.36 mm between each adjacent pair of said cord elements.

14. A toothed belt as set forth within claim 1, wherein said rubber forming said front rubber layer and forming said back rubber layer comprises hydrogenated nitrile rubber having a hydrogenation rate of no less than 91%.

15. A toothed belt as set forth in claim 14, wherein said rubber forming said front rubber layer and said back rubber layer contains an organic peroxide vulcanizing agent.

16. A toothed belt as set forth in claim 14, wherein said rubber forming said front rubber layer and said back rubber layer contains sulfur as a vulcanizing agent, and a sulfur vulcanizing accelerator.

17. A toothed belt as set forth in claim 1, wherein said cord elements are treated with a resorcinol formaldehyde latex solution, a rubber solution and a solution of cashew-modified phenol resin.

18. A toothed belt as set forth in claim 1, wherein said cover fabric and said rubber forming said front rubber layer are preformed into a tooth profile.

19. A toothed belt as set forth in claim 1, wherein each of said cord elements comprises high strength glass fibers.

20. A toothed belt as set forth in claim 19, wherein said cord elements are arranged with a gap of approximately 0.17 to approximately 0.28 mm between each adjacent pair of said cord elements.

* * * * *